US010311192B2

(12) United States Patent
Venkatesh et al.

(10) Patent No.: US 10,311,192 B2
(45) Date of Patent: Jun. 4, 2019

(54) SYSTEM AND METHOD FOR POWER VERIFICATION USING EFFICIENT MERGING OF POWER STATE TABLES

(71) Applicant: Synopsys, Inc., Mountain View, CA (US)

(72) Inventors: Shekaripuram V. Venkatesh, Los Altos, CA (US); Sanjay Gulati, New Delhi (IN); Vishal Keswani, New Delhi (IN); Manish Goel, Noida (IN); Nitin Sharma, Noida (IN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/815,202

(22) Filed: Jul. 31, 2015

(65) Prior Publication Data

US 2016/0292346 A1 Oct. 6, 2016

Related U.S. Application Data

(60) Provisional application No. 62/140,386, filed on Mar. 30, 2015.

(51) Int. Cl.
*G06F 17/50* (2006.01)
(52) U.S. Cl.
CPC ............... *G06F 17/5081* (2013.01)
(58) Field of Classification Search
CPC ........... G06F 2217/78; G06F 17/505; G06F 17/5045; G06F 2217/84; G06F 17/5022; G06F 17/5081

(Continued)

(56) References Cited

U.S. PATENT DOCUMENTS 7,954,078 B1 5/2011 Wang et al.
7,958,475 B2 6/2011 Khan
(Continued)

OTHER PUBLICATIONS

Printout: L. Lang, Semiconductor Engineering: "Power Mode and State", http://semiengineering.com/power-mode-and-state/, Jul. 12, 2012, 6 pages.

(Continued)

*Primary Examiner* — Nghia M Doan
(74) *Attorney, Agent, or Firm* — Fenwick & West LLP

(57) ABSTRACT

A power verification system requires a combination of design and its power intent. A power intent (PI) input specifies the power architecture of a design through specification of power/voltage domains, their corresponding power supplies and a collection of power management devices. Power state tables (PSTs) specified in PI capture the legal combinations of power states (voltage values) for the various sets of supply nets or supply ports of a design. A power verification system requires determining the power supply relationships of voltage/power domains which requires merging of PSTs. The system described efficiently merges PSTs by iteratively selecting only a subset of PSTs that are relevant to the supply pair of interest, that are pruned initially and as the merge progresses. This provides orders of magnitude speedup and resource reduction. A user interface allows display of identified power verification failures and may include an input device for facilitating correction of at least one of the electronic circuit design and the power intent file.

20 Claims, 11 Drawing Sheets

(58) Field of Classification Search
USPC .......... 716/103, 106, 108–111, 120; 99/103, 99/106, 108–111, 120
See application file for complete search history.

(56) References Cited

U.S. PATENT DOCUMENTS

| | | | |
|---|---|---|---|
| 8,086,980 B2 | 12/2011 | Vogel | |
| 8,176,453 B2 | 5/2012 | Yang et al. | |
| 8,407,635 B2 | 3/2013 | Chopra | |
| 8,448,112 B1 | 5/2013 | Kashai et al. | |
| 8,516,422 B1 * | 8/2013 | Wang | G06F 17/505 703/16 |
| 8,732,636 B2 | 5/2014 | Ginetti et al. | |
| 8,762,906 B2 | 6/2014 | Ginetti et al. | |
| 8,839,164 B2 | 9/2014 | Kavalipati et al. | |
| 9,679,097 B2 * | 6/2017 | Srivastava | G06F 17/5081 |
| 2010/0192115 A1 * | 7/2010 | Yang | G06F 17/5022 716/104 |
| 2013/0297280 A1 | 11/2013 | Feng et al. | |

OTHER PUBLICATIONS

Printout: V. Ramaswamy et al., "PST Verfication-Best Practices", Verification Martial Arts, https://www.vmmcentral.org/vmartialarats/2013/02/pst-verification-best, Feb. 4, 2013, 4 pages.

A. Srivastava et al., "Low Power SoC Verification: IP Reuse and Hierarchical Composition using UPF", DVCon 2012, 131-11287, pp. 1-14.

Printout: "Methodology for effective hierarchical verification of low power designs", 50th Design Automation Conference, Jun. 2013, 14 pages.

H. Vardhan et al., "Is Power State Table Golden?", EE Times, DVCon 2012, www.eetimes.com/author.asp?, Feb. 2012, 8 pages.

H. Bhatt et al., "Combining Static and Dynamic Low Power Verification for the Power-Aware SoC Sign-off", IEEE Std. 1801, 2009, 6 pages.

* cited by examiner

400

410

| VDDA | VDDD | VDDX |
|---|---|---|
| ON | ON | ON |
| OFF | OFF | ON |

420

| VDDD | VDDC |
|---|---|
| ON | ON |
| OFF | OFF |

430

| VDDC | VDDB | VDDE |
|---|---|---|
| ON | ON | ON |
| OFF | OFF | ON |

440

| VDDP | VDDQ |
|---|---|
| ON | ON |
| OFF | ON |

450

| VDDA | VDDD | VDDC | VDDB | VDDE | VDDP | VDDQ | VDDX |
|---|---|---|---|---|---|---|---|
| ON | ON | ON | ON | ON | ON | ON | ON |
| ON | ON | ON | ON | ON | OFF | ON | ON |
| OFF | OFF | OFF | OFF | OFF | ON | ON | ON |
| OFF | OFF | OFF | OFF | OFF | OFF | ON | ON |

| VDDA | VDDD | VDDX |
|---|---|---|
| ON | ON | ON |
| OFF | OFF | ON |

461

| VDDD | VDDC |
|---|---|
| ON | ON |
| OFF | OFF |

| VDDA | VDDD | VDDC |
|---|---|---|
| ON | ON | ON |
| OFF | OFF | OFF |

| VDDA | VDDD | VDDC |
|---|---|---|
| ON | ON | ON |
| OFF | OFF | OFF |

481

| VDDC | VDDB | VDDE |
|---|---|---|
| ON | ON | ON |
| OFF | OFF | ON |

| VDDA | VDDD | VDDC | VDDB |
|---|---|---|---|
| ON | ON | ON | ON |
| OFF | OFF | OFF | OFF |

Figure 4E

610 — Top PST

| VDD | VDDA | VDDB | VSS |
|---|---|---|---|
| ON | ON | ON | ON |
| OFF | OFF | OFF | ON |

611 — Inst/PST

| VDD | VDDg | VSS |
|---|---|---|
| ON | ON | ON |
| ON | OFF | ON |
| OFF | OFF | ON |

630 — Top PST

| VDD | VSS |
|---|---|
| ON | ON |
| OFF | ON |

631 — Inst1/PST

| VDD | VSS |
|---|---|
| ON | ON |
| OFF | ON |

635 — Inst3/PST + Inst4/PST

| VDD | VSS |
|---|---|
| ON | ON |
| OFF | ON |

640 — Inst2/PST + Inst3/PST + Inst4/PST

| VDD | Inst2/VDDg | VSS |
|---|---|---|
| ON | ON | ON |
| ON | OFF | ON |
| OFF | OFF | ON |

Figure 6D

650 — Final Merged PST = Top PST + all Inst/PST

| VDD | Inst1/VDDg | Inst2/VDDg | VSS |
|---|---|---|---|
| ON | ON | ON | ON |
| ON | ON | OFF | ON |
| ON | OFF | ON | ON |
| ON | OFF | OFF | ON |
| OFF | OFF | OFF | ON |

Figure 6E

SYSTEM AND METHOD FOR POWER VERIFICATION USING EFFICIENT MERGING OF POWER STATE TABLES

CROSS-REFERENCE TO RELATED APPLICATION

This application claims the benefit under 35 U.S.C. 119(e) from prior U.S. provisional application No. 62/140,386 filed Mar. 30, 2015.

TECHNICAL FIELD

This invention relates to the field of integrated circuits verification and in particular to verification of powers subsystems.

BACKGROUND ART

Low power consumption in a Soc (System on Chip) is increasingly important. The designs of Socs incorporate many techniques to reduce power consumption. One technique is for the designer to use multiple voltage levels, since the voltage needs to be high only for high frequency modules of the SoC, and low voltage levels reduce power consumption. Modules of a Soc that have voltages powering them that are different from the voltages powering some other module to which they are connected are called Voltage Domains. Another technique to reduce power consumption is to turn power off completely from a module during the time that it does not need to be powered. Voltage domains one or more of whose supply voltages is dynamically turned ON/OFF are called Power Domains. Turning power OFF completely is becoming more effective compared to clock disabling as circuit design rules shrink and the leakage current increases compared to the switching current. These modern techniques along with others create new requirements in the Soc design. Some of these requirements are:

A level shifter is needed between the output port of a module that is connected to the input port of another module whenever the two ports (that is, the logic connected to the two ports) are powered with a different voltage.

A register-state retention and restore circuit may be needed for critical registers of a module when the power to a module is removed.

Isolation circuits are needed following an output port of a module whose power is turned off (port floats) and the port is connected to an input port of a module that is powered.

Logic circuits for dynamically turning power on/off on some or all of the power ports of some or all the modules need to be added.

A power verification tool needs to determine when such additional circuits are required and when they are not required. Power State Tables (PSTs) have key information that helps decipher this requirement. A global power state table contains different power supplies used in a SoC as columns, and all possible combinations of ON/OFF and other possible states (voltage values) that may occur during SoC operation as rows. Given a connection between an output port and an input port, and knowing which power supplies power these 2 ports, the power state table shows for example which of the ON/OFF combinations for the 2 power supplies can •occur, whether there are different voltage levels between the supplies, and therefore what additional circuitry if any is needed between the input and output ports.

SoC developers normally specify the power architecture (definition of voltage/power domains, use of retention registers and more) in separate files from the logic design specification. The power architecture specification is usually called the "power intent" (PI) and is, expressed in languages like Unified Power Format (UPF); described in the IEEE Standard for Design and Verification of Low-Power Integrated Circuits. This IEEE standard establishes a format used to define the power intent for electronic systems and electronic intellectual property (IP) The format provides the ability to specify the power supply network, switches, isolation, retention, and other aspects relevant to power management of an electronic system. The standard defines the relationship between the power intent specification and the logic design specification captured via other formats [e.g., standard hardware description languages (HDLs)].

Electronic design automation (EDA) tools like Spyglass from the assignee verify the power architecture of an electronic design by comparing the power intent specification to the logic design and checking for coherence, correctness and the existence of necessary power-interface components.

Traditional power verification systems create one large power state table containing all the power supplies of the SoC. As Socs increase in size and complexity, the number of power supplies and voltage domains increase and can become several scores in number, all so that power consumption can be kept down. But this causes an explosion in the size of the power state table (PST), the time needed to create it, and the resources needed to store it.

As Soc designs continue to grow in terms of complexity and number of transistors, the verification times increase and the memory requirements of the EDA tools grow. Power verification is one of the last development activities before tape-out, so SoC developers are under pressure to complete it quickly. Soc developers would benefit greatly if the verification time could be reduced from days to hours.

SUMMARY DISCLOSURE

The Efficient Power Verification System (EPVS) infers relationships between power supplies in a Soc that has more than one voltage or power domain. A power intent (PI) input specifies the power architecture of a design through the specification of power domains, supply networks and through a collection of devices such as isolation logic, level shifters, retention registers, and power switches. Power state tables (PSTs) capture the legal combinations of power states for the various sets of supply nets or supply ports of a design. To determine power supply relationships, the EPVS efficiently merges PSTs by iteratively selecting only a subset of PSTs that are reduced in size. This merging involves a sanitization step to remove any inconsistent power state in the design. After considering power supplies whose relationship need to be scrutinized, the EPVS finds a subset of PSTs that may need to be merged in order to determine their relationships. PSTs may be repeatedly merged two at a time starting by selecting the two PSTs that have the greatest number of power supplies in common. When a pair of PSTs is merged, their rows and columns are pruned to retain only the most relevant information. The process results in an overall merged PST that is small in size and quick to construct. The supply pair relationship is retrieved by examining the merged PST; a key aspect of the power verification system.

The overall process entails choosing only a subset of PSTs that are relevant to the supply pair at hand, which are pruned initially and as the merge progresses. Accordingly, the EPVS provides orders of magnitude speedup and resource reduction. The speedup facilitates an interactive human interface for querying the EPVS about the power supply relationships it has determined, e.g., allowing a user to view one or more PSTs at a user-specified hierarchical scope and to view port states of a user-specified port at a user-specified scope.

BRIEF DESCRIPTION OF THE DRAWINGS

FIG. 4A shows an example of 4 PSTs being merged to produce a combined PST using a previous method of PST merging. This is contrasted with the EPVS approach using selective PST merging in FIGS. 4B, 4C, 4D, and 4E.

FIGS. 6A, 6B, 6C, 6D, and 6E show key merging steps to find the power relationship between two switched supplies of instances inst1 and inst2 of the example circuit in FIG. 5. The final merged PST shows that isolation circuits are needed for any connect between portions of inst1 and inst2 that are powered by switched supplies.

DETAILED DESCRIPTION

The Efficient Power Verification System (EPVS) verifies the power implementation of an electronic design by efficiently deriving relationships between power supplies. The EPVS accepts as inputs a Power Intent written using a format such as Unified Power Format (UPF), and a circuit design provided in a netlist or written in a hardware description language such as RTL (such as Verilog). The EPVS can accept queries via a GUI widget and can provide determination of power relationships interactively in real-time.

A Soc may have many independent modules, each powered by several different power supplies, many of which are common to more than one module. The EPVS determines the power supplies for each module, and all allowed combinations of ON/OFF an possibly other states (voltage values) for the power supplies of each module. This information is represented by a power state table for the module (PST). A PST has a column for each of the different power supplies powering the module. Each entry in the PST is ON or OFF or some other value such as SLEEP, ACTIVE, IDLE etc., each of which corresponds to a specific voltage value. Each row in the PST represents an allowed combination of states (ON/OFF or other values) for the supplies powering the module.

A Soc PST is a table with columns for all the voltages powering all the modules of the SoC, and rows for all the allowed combinations of states. Previous power verification systems created it from the individual module PSTs by repeatedly merging two PSTs, and merging the resulting PST with one of the unmerged PSTs. Many merges of increasing complexity are needed in general. From such a merged table all the power circuit requirements for all module interconnects can be readily derived at the Soc level. However, the typical PST finally obtained is extremely large, and constructing it requires many repetitive and tedious steps.

A typical power verification system uses the information extracted from the Soc PST to analyze 2 voltage supplies at a time that power a particular output/input port pair of modules that are interconnected. All information needed can be obtained from the one Soc PST for all voltage pairs, but the EPVS obtains the same information far more efficiently.

Figure 1:
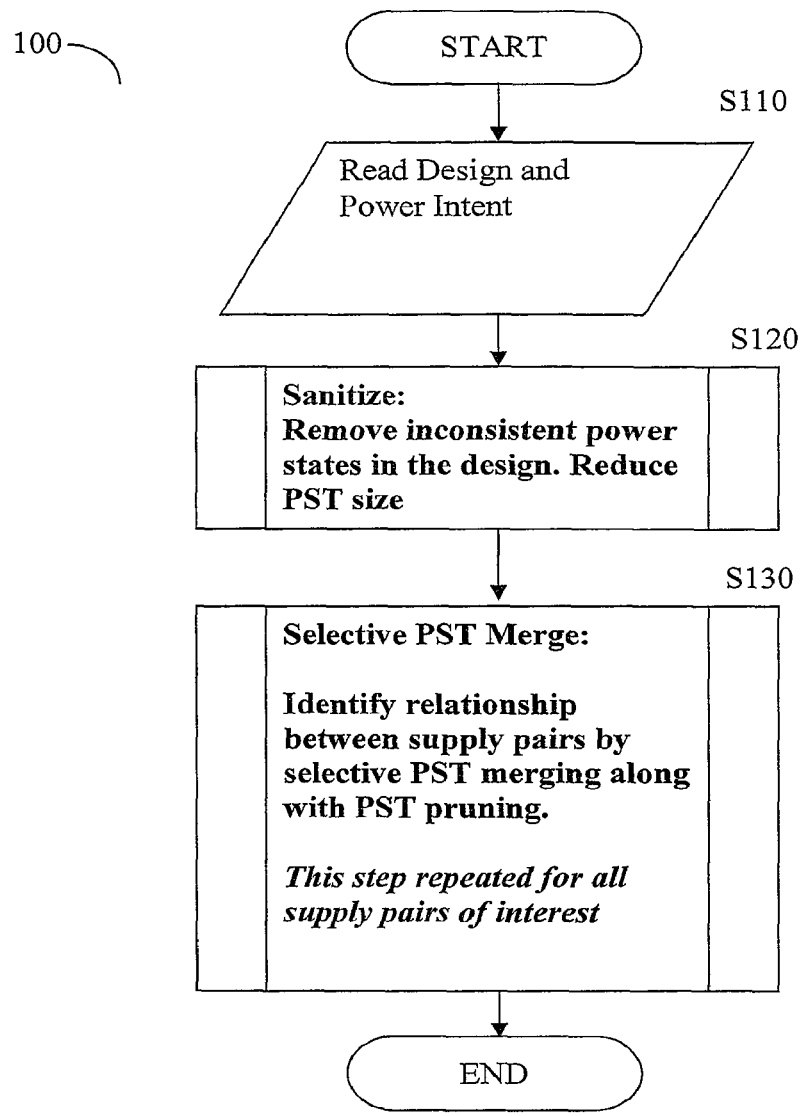
FIG. 1 shows a flowchart of the steps used by the EPVS for creating a PST.

FIG. 1 is an exemplary and non-limiting flowchart 100. Flowchart 100 shows the steps for efficient determination of SoC power supply relationships.

In step S110 the EPVS reads the design and power intent.

Figure 2A:
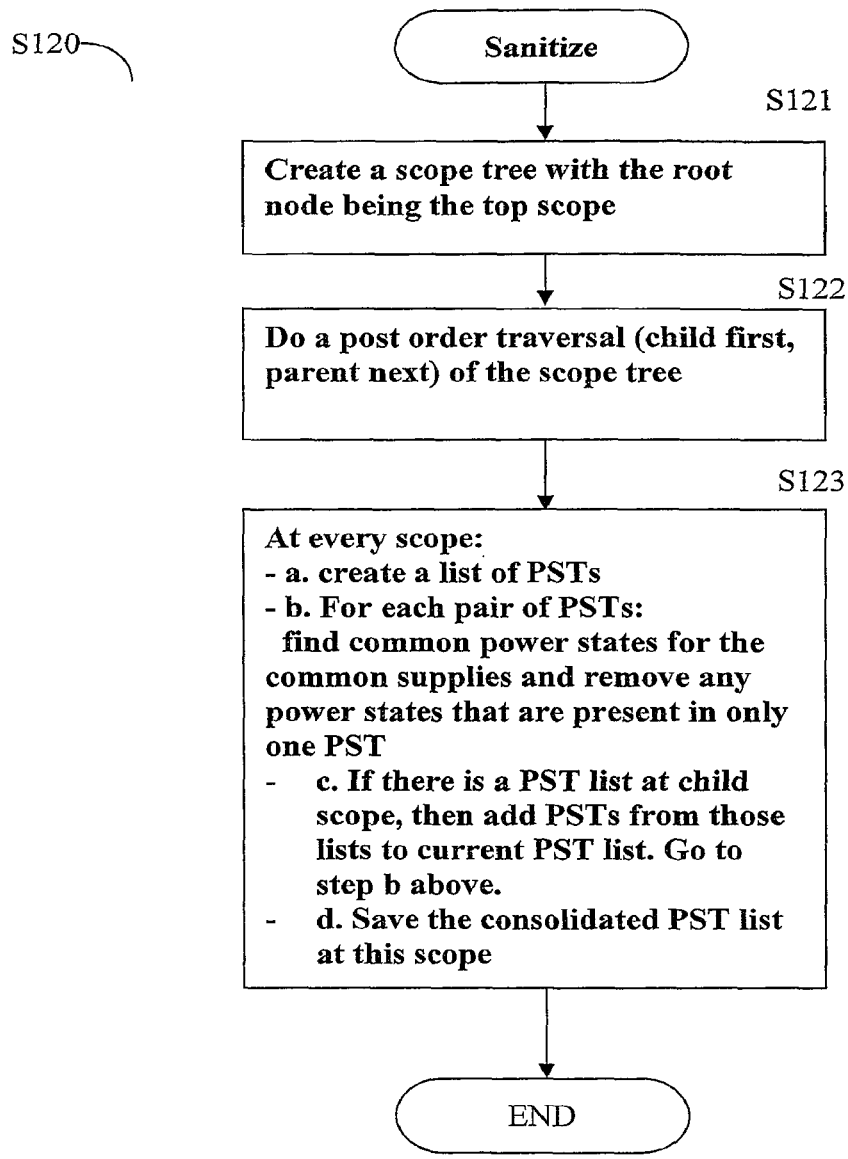
FIG. 2A shows a flowchart of the sanitization step of the EPVS.

In step S120 the EPVS removes inconsistent power states in the PSTs of the design, a process called sanitization that is described in detail in FIG. 2a.

In step S130 the EPVS performs selective PST merging. Selective PST merging is the process in which the EPVS finds the relationship between two supplies by merging a relevant subset of the PSTs. This step is repeated for all supply pairs of interest. This is elaborated in FIG. 2b.

FIG. 2a is an exemplary and non-limiting flowchart S120. Flowchart 120 shows the sanitization step that flags and removes inconsistent power states in the design. An example is a module whose power intent includes a state (e.g. ON or OFF) that is not specified in the power intent of another module that uses the same power supply.

In step S121 the EVPS creates a scope tree with the root node being the top scope, i.e. the Soc. The modules of the Soc are naturally organized in a hierarchy since every modules is a submodule either of a higher level module or of the Soc.

In step S122 the EVPS does a post order traversal (child first, parent next) of the scope tree.

In step S123 at every scope, the EVPS does the following:
1. Creates a list of all the PSTs defined in that scope.
2. For every pair of PSTs:
  a. Finds the common supplies.
  b. Finds and keeps the unique power states for the common supplies.
  c. Removes any power states that are present in only one PST.
3. If there is a PST list of child scope, then adds PSTs from those lists to the current PST list. Go to step 2.
4. Save this consolidated PST list at this scope.

At the end, PST at each scope is replaced by the sanitized version of it. This step leads to an overall reduction in the size of the PSTs at hand. By removing inconsistent power states of the PSTs of the design.

Figure 3A:
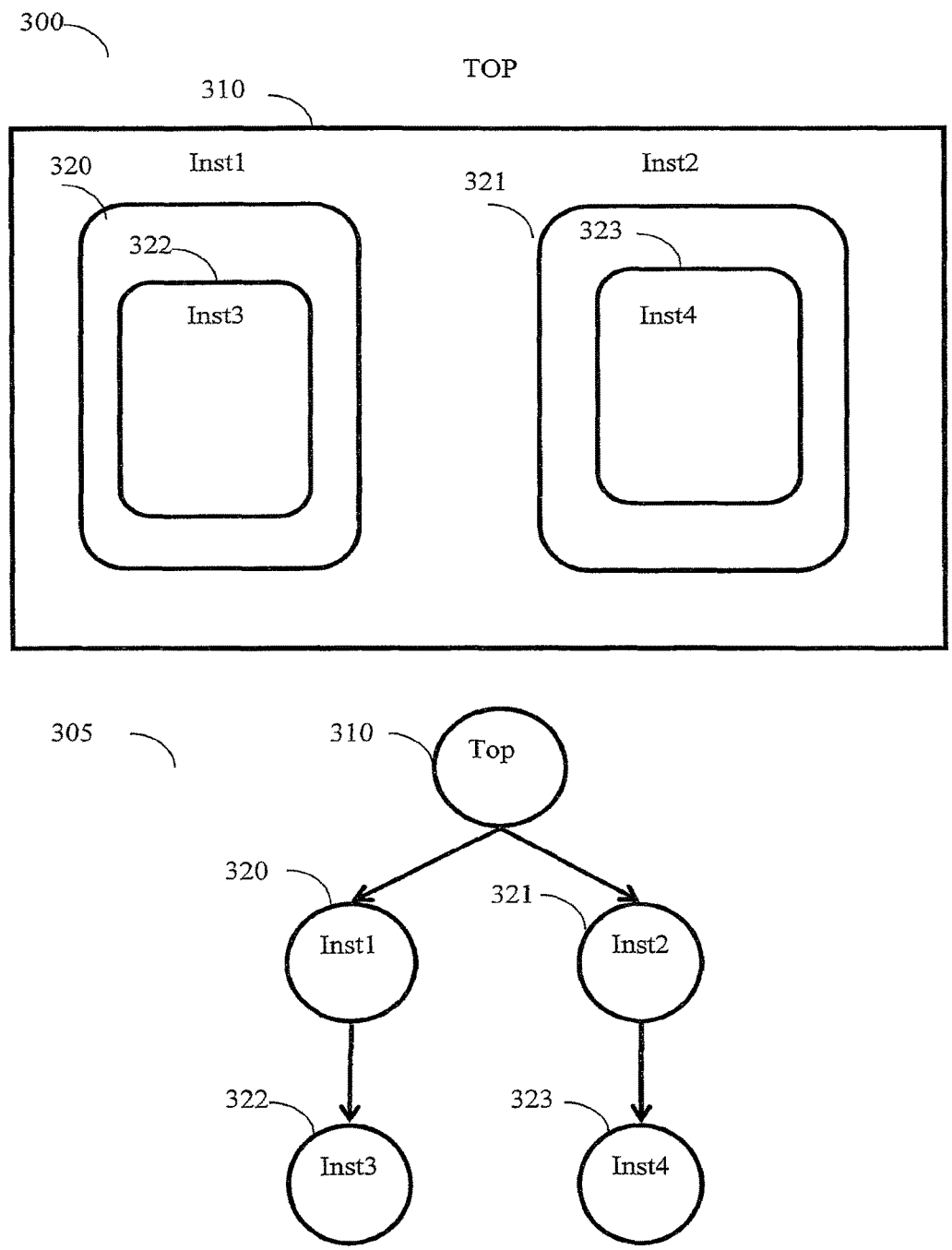
FIG. 3A shows an example of a scope tree of the modules and submodules of a Soc.

FIG. 3a is an exemplary and non-limiting diagram 300 showing the scope relationships between voltage domains in a SoC.

Box 310 is a representation of the nested hierarchical relationships between the Soc 310 and 4 modules labeled Inst1 320, Inst2 321, Inst3 322, and Inst4 323. Inst3 322 is a module contained in module Inst1 320 which is contained in the top level in the Soc 310. Inst4 323 is a module contained in module Inst2 321 which is contained in the top level in the SoC 310.

Figure 3B:
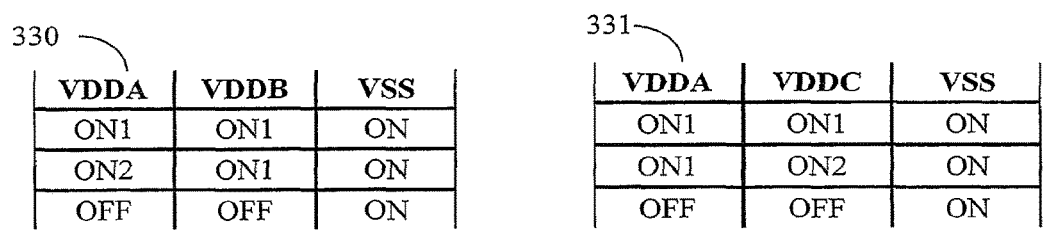
FIGS. 3B, 3C, and 3D show a small example of the sanitization step.

Tree 305 is a representation of the derived scope tree representing the nesting of the modules. Sanitization is done by traversing the tree post order, child first. The tree is traversed as follows:

In Node 322: Sanitize PST at Inst3.
In Node 320: Sanitize PST at Inst1, bring list of PSTs from child scope at this level and sanitize.
In Node 323: Sanitize PST at Inst4.
In Node 321: Sanitize PST at Inst2, bring list of PSTs from child scope at this level and sanitize.
In Root 310: Sanitize PST at Top scope, bring list of PSTs from child scope at this level and sanitize. The final list contains all the PST in the design FIG. 3b shows two PSTs, PST 330 and PST 331 that are to be pairwise sanitized.

Figure 3C:

FIG. 3c shows PST 340 and PST 341, the unique power states having only common supplies VDDA and VSS of PST 330 and PST 331.

State ON2 in PST 340 is not present in PST 341, so the EPVS will remove this state.

Figure 3D:
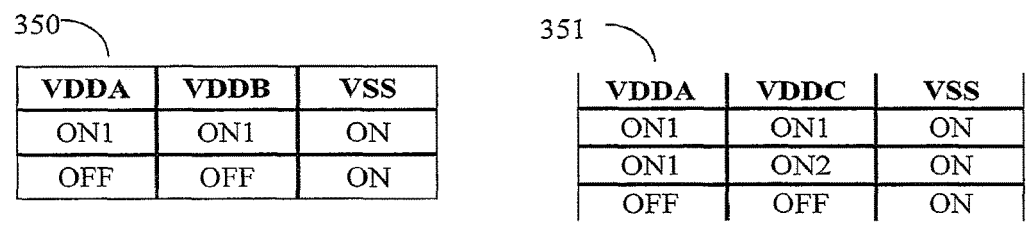

FIG. 3d shows PST 350 and PST 351, which are PST 330 and PST 331 after removal of the inconsistent states. In this example, PST 330 has had the state with ON2 removed, while PST 331 is unchanged.

Figure 2B:
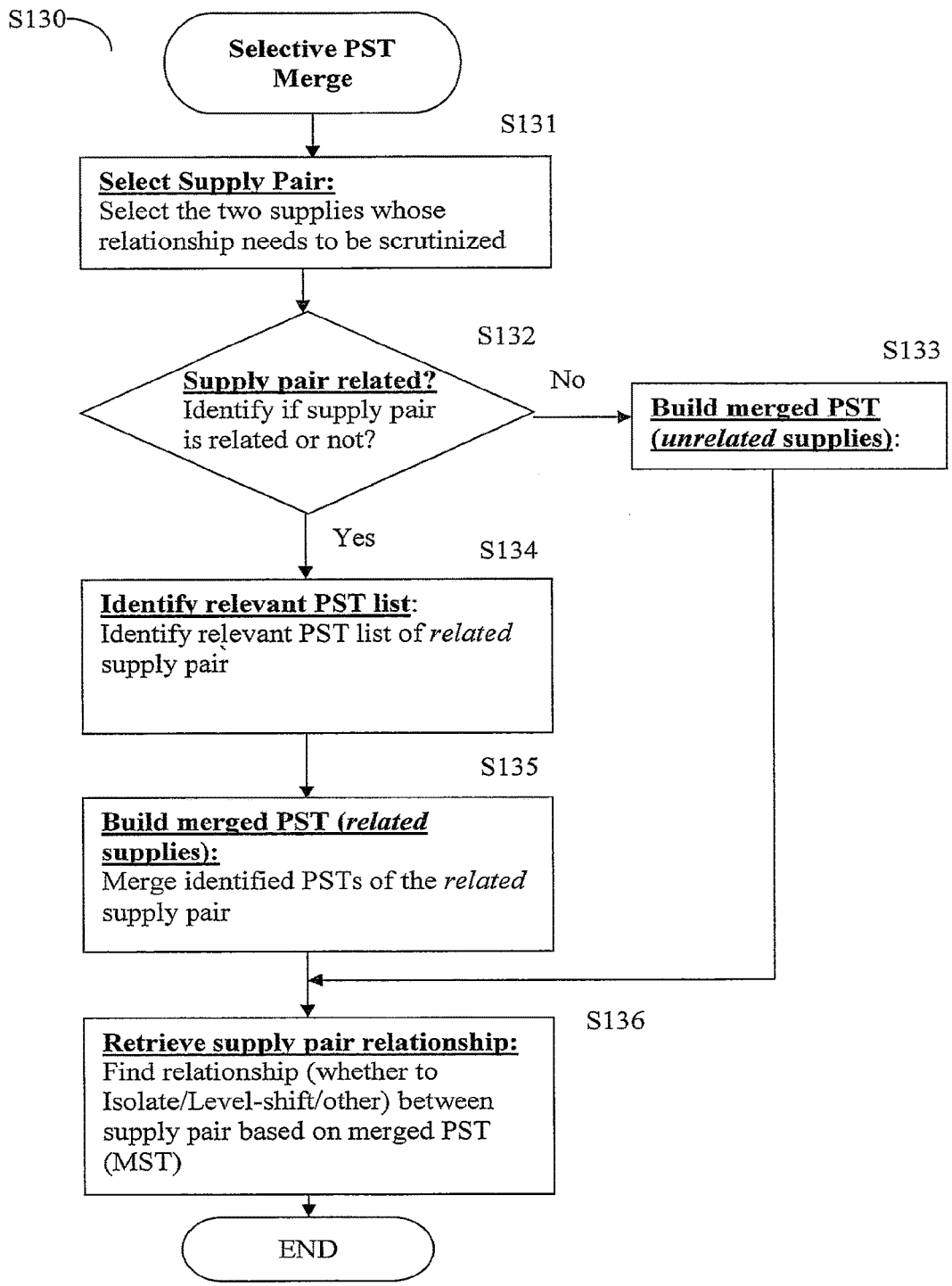
FIG. 2B shows a flowchart of the "Selective PST Mergen.

FIG. 2b is an exemplary and non-limiting flowchart of 8130. Flowchart S130 shows the selective PST merging that is done for every supply pair whose relationship needs to be determined. The relationship between the supply pair helps determine if isolation, level-shifting or other circuit additions are needed between the modules—a key aspect of the power verification.

Step S131 first clearly establishes the two supplies whose relationship needs to be scrutinized.

Step S132 determines if the two supplies are related or not using the following steps. The broad approach is to start with one of the supplies (Supply A) and see if the other supply (Supply B) can be reached through a set of PSTs.

A. Create a supply list S and add the first supply (Supply A) to it.
B. Loop through all supplies in the supply list S (adding new supplies along the way)
  a. For each supply 'sup' in list S do the following: (This step handles the next supply, which has not been processed yet)
    i. Find the list of PSTs (list P') in which supply 'sup' exists
    ii. Add all the supplies present in PSTs of list P' to list S
    iii. If the second supply (Supply B) exists in list S, this means the two supplies A and B are related. Return true, and exit from the loop. Go to the next step—Step 133.
    iv. Mark the presently processed supply 'sup' as processed/visited
  b. Since the second supply was never added to supply list S, this means the two supplies are not related.

Step 133 builds the merged PST of unrelated supply pairs. If there is no relationship between the two supplies (checked in step 132), then take all the possible combinations of port states of the two supplies used in their PSTs to build the merged PST.

Step S134 is to identify a relevant PST list of related supply pairs. This is done as follows. If there exists a relationship between the two supplies then identify the list of PSTs that need to be merged in order to find the relationship, using the following steps:
  a. Find a list of all PSTs which have one or both the candidate supplies (list A).
  b. Create a unique list of extra supplies (Supply list S) that are part of the list A PSTs. Find all additional PSTs with these extra supplies. Call this list of PSTs list B.
  c. Take the union of list A and list B into list A
  d. Check if new PSTs are added in list A after step c. If yes go to step b. Otherwise exit, as we have identified the PST list to be merged; return this list—list A.

In step S135 all relevant PSTs identified in the previous step 134 are merged. The EPVS repeatedly merges two PSTs at a time, ultimately to build one final Merged State Table (MST). In this step the EPVS tries to keep the size of the merged PST minimal after every merge, for best performance. Details of the step are as follows:

1. Review the List of PSTs to be merged (list A from the previous step S134). Merge two PSTs at a time, by selecting the two PSTs that have the most number of common supplies. This helps in keeping the size of merged PST minimal at every step.
  a. The merging for each pair of PSTs is as follows:
    i. Find the common supplies in the 2 PSTs.
    ii. Find unique power states (rows) having only the common supplies.
    iii. On the basis of common power states, find the port states (column values) of uncommon supplies in the respective PST. That is, for each common power state (partial row of a PST), find the port state combinations of uncommon supplies in the respective PST.
    iv. Create combinations of port state values for uncommon supplies corresponding to every common power state.
    v. The states created in step d comprise the merged PST.
  b. During merging, remove the supplies that are present only in one PST among the set of PSTs chosen for merge. However do not remove the supply whose relationship you wish to identify.
  c. After every merging step, remove any power states that are identical.

Step S136 is the final step, where based on the merged PST, also known as the Merged State Table (MST), the relationship between the pair of supplies is determined.

To find the power relationship between any two supplies the previous non-selective PST merge approach merges all PSTs in the design to create a system level MST. It then examines the large MST to look for the relationship between the supplies (columns in MST).

FIG. 4a is an exemplary and non-limiting diagram. Diagram 400 shows the non-selective merging of several PSTs to produce a merged PST.

PST 410, PST 420, PST 430, PST 440 are merged, producing the merged PST 450. To find the relationship between say two supplies VDDA and VDDB one has to examine the large merged PST 450. For instance, one can safely ascertain that there is no need for isolation logic between VDDA and VDDB as they are either both ON or both OFF at the same time.

The selective PST merging of EPVS follows a different approach. To find the relationship between VDDA and VDDB the merging is done as follows:

Step 1: Consider VDDA & VDDB as the supplies whose relationship needs to be identified. PST1, PST2, PST3, PST4 refer to PSTs in the FIG. 4a namely 410, 430, 420, 440.

Step 2: Check if VDDA and VDDB are related or not.
  i. Create a supply list S having VDDA;
  ii. Iteration 1:
    1. Take the first supply in S i.e. VDDA;
    2. Create list of PSTs in which VDDA exists P'=[PST1];
    3. Identify the supplies in PSTs of list P'=[VDDA, VDDD, VDDX];

4. Update supply List S=[VDDA, VDDD, VDDX];
5. Supply VDDB does not exist in list S iii. Iteration 2:
1. Take second supply in S which is VDDD;
2. Create list of PSTs in which VDDD is present P'=[PST1, PST3];
3. Identify the supplies in PSTs of P'=[VDDA, VDDD, VDDX, VDDC];
4. Update supply list S=[VDDA, VDDD, VDDX, VDDC];
5. VDDB does not exist in list S iv. Iteration 3:
1. Take next supply in S which is VDDX;
2. Create list of PSTs in which VDDX is present P'=[PST1];
3. Identify the supplies in PSTs of P' [VDDA, VDDD, VDDX];
4. Update supply list S=[VDDA, VDDD, VDDX, VDDC];
5. VDDB does not exist in list S v. Iteration 4:
1. Take next supply in S i.e. VDDC;
2. Create list of PSTs in which VDDC is present P'=[PST2, PST3];
3. Identify supplies in PST of P=[VDDA, VDDC, VDDB, VDDE];
4. Update supply list S=[VDDA, VDDD, VDDX, VDDC, VDDB, VDDE];
5. VDDB exists in S which means a power relationship can be found between VDDA and VDDB by merging PSTs Step 3: It has been established that VDDA, VDDB are related (so there is no need to process as though unrelated).

Step 4: Identify PSTs that need to be merged i. Iteration 1:
1. Make a list of PSTs in which either of the two supplies are present; list A=[PST1, PST2];
2. The supply list S contains [VDDA, VDDD, VDDX, VDDC, VDDB, VDDE];
3. Find the list of additional PSTs corresponding to extra supplies in supply list S;
4. This is list B=[PST3];
5. Make a union of list A and list B, updating list A=[PST1, PST2, PST3];

ii. Iteration 2:
1. List A=[PST1, PST2, PST3];
2. The supply list S contains [VDDA, VDDD, VDDX, VDDC, VDDB, VDDE];
3. Find the list of additional PSTs corresponding to extra supplies of supply list S;
4. This is List B=[ ];
5. Make a union of list A and list B, updating List A=[PST1, PST2, PST3];
6. No new PSTs are added in list A. This means list A contains all the PSTs that need to be merged to find the relationship between the supplies at hand.

FIG. 4b shows the selective merging of PSTs—PST1, PST2, and PST3 (PST 410, 430, 420 respectively in FIG. 4a). The order of merging is chosen so that the PSTs with the largest number of common supplies are merged first.

Combination PST1 and PST2 have 0 common supplies.
Combination PST1 and PST3 have 1 common supplies.
Combination PST2 and PST3 have 1 common supplies.
So start the merging with PST1 460 and PST3 461.

FIG. 4c shows the merging of PST1 and PST3. Supply VDDX is discarded as it is present in only one PST (PST1), producing PST1+PST3, that is, PST 470.

FIG. 4d shows the merging of PST1+PST3 480 and PST2 481. Supply VDDE is discarded as it is present only in PST2.

FIG. 4e shows the final merged PST 490.

The final merged PST (MST) with the selective merging of PSTs is a considerably smaller table which establishes the relationship between the supplies VDDA and VDDB, which was the original supply relationship that was being sought.

FIG. 5 is an exemplary and non-limiting diagram showing an example of a circuit design Sa on the left and the power intent of that circuit Sb on the right.

Power Switched Circuits in FIG. 5a, 510, 511, 512, 513 are identical circuits Inst1, Inst2, Inst3, Inst4, connected together. They switch voltage VDD on and off for each module.

Figures 5A, 5B:
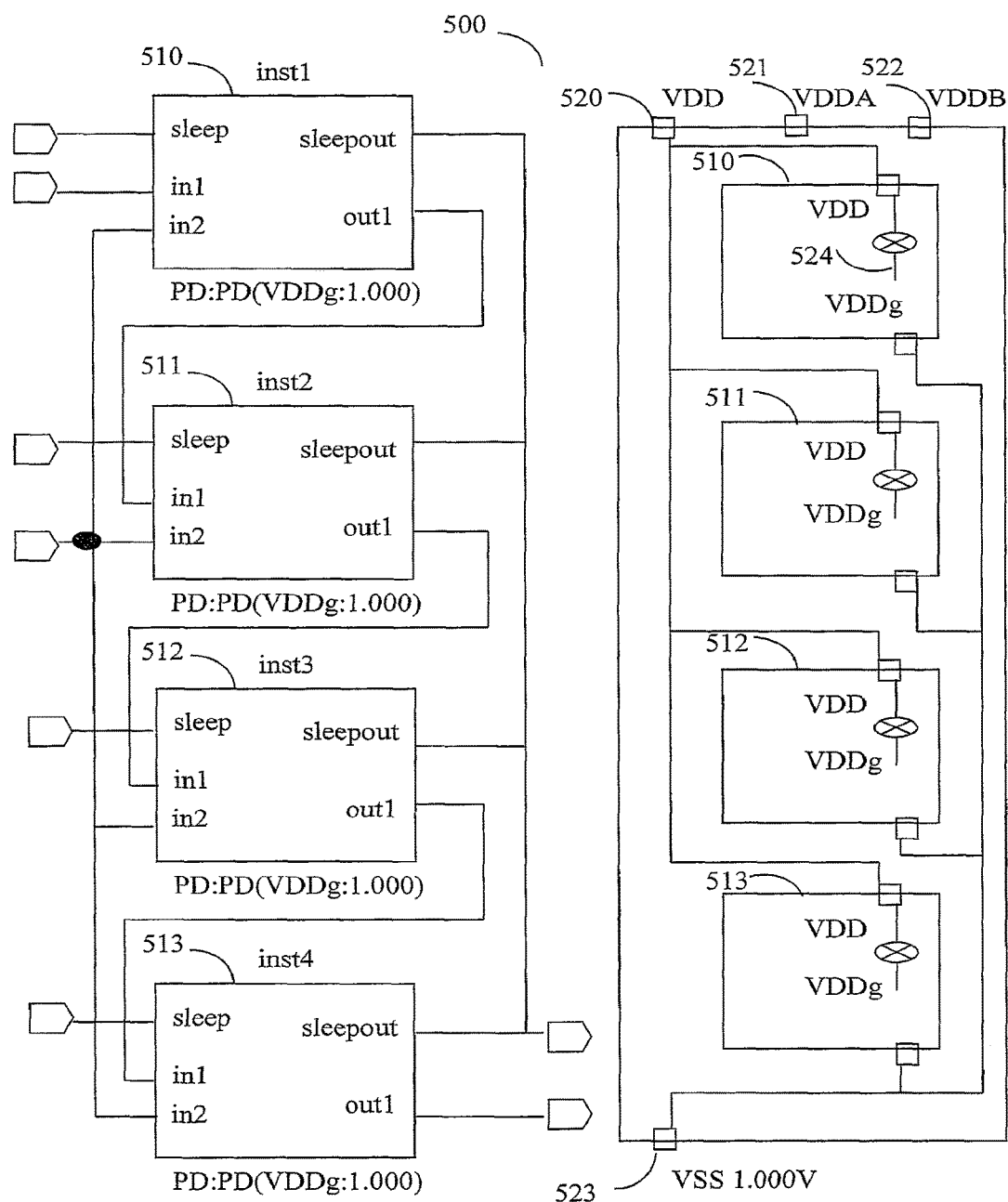
FIGS. 5A and 5B show an example circuit and its corresponding power intent, which is then used to illustrate the EPVS.

The Power Intent View of circuit Sa is shown in FIG. 5b. The power intent is expressed using a language such as the Unified Power Format (UPF) language. The power intent view shows the same four modules and their power connectivity. Inst1 510 is connected to power supply VDD 520, and VSS 523. Inst2 511, Inst3 512 and Inst4 513 are similarly connected. The top level of the SoC is connected to power supplies VDD 520, VDDA 521, VDDB 522 and VSS 523. VDDg 524 is the switched output of VDD inside Inst1.

FIG. 6 is an exemplary and non-limiting diagram that shows stages of the application of EPVS to the design and power intent of FIG. 5. EPVS here analyzes the power relationship of interconnected ports one of which is powered by switched-output of Inst1(Inst1/Vddg) and the other by switched output of Inst2(Inst2/Vddg) power supplies.

PST 610 shows the PST of the top module. PST 611 shows the PST of the 4 modules Inst1, Inst2, Inst3 and Inst4 (all 4 modules have identical PSTs in this example). Top level supply VDD is connected to Inst1/VDD, Inst2/VDD, Inst3/VDD and Inst4/VDD. Top level supply VSS is connected to Inst1/VSS, Inst2/VSS, Inst3/VSS and Inst4/VSS. VDDg is the gated output from each switch with input supply VDD.

Figures 6A, 6B, 6C:
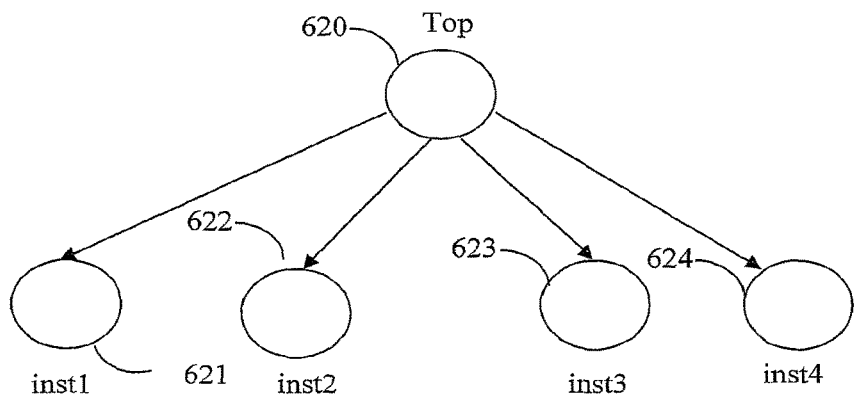

FIG. 6b shows the scope tree corresponding to the circuit arid power intent of the example. It shows the top module 620 and the 4 modules Inst1 621, Inst2 622, Inst3 623, and Inst4 624 as children on independent branches. Inst1 621, Inst2 622, Inst3 623, and Inst4 624 all have 1 PST each. Since there are no child scopes for these, no sanitization is required at these scopes.

At the top scope, there is only one PST. Bring the PST list from first child viz. Inst1 to this level.

The top scope now consists of 2 PSTs—/PST and Inst1/PST. Do sanitization as follows:
1. Identify the common supplies: VDD and VSS.
2. Create a table with all unique power states of common supplies.

FIG. 6a shows the top PST 610 and Inst1/PST 611 at this point:
3. There is no power state that is present in only one PST. So there is no need to remove any state, from either of the PSTs.
4. Take the PST list of the next child—Inst2
5. The Top scope will now have 3 PSTs [/PST, Inst1/PST, Inst2/PST].
6. Again sanitization will not remove any states.
7. Repeat the above steps till all the PSTs are at the Top scope.
8. At the end, the Top scope will have all 5 PSTs: [/PST, Inst1/PST, Inst2/PST, Inst3/PST, Ins4/PST]

Selective merging is now done:

i. Find the relationship between Inst1/VDDg and Inst2/VDDg;
ii. Based on the steps described, the PST list will contain all the 5 PSTs;
iii. All the PSTs have 2 supplies in common, so we can start from any 2 PSTs;
iv. Merge Inst3/PST and Inst4/PST;
v. Identify the common supplies: VDD and VSS;
vi. While merging remove supplies Inst3/VDDg and Inst4/VDDg as they exist in only 1 PST each. After merging remove any duplicate power states, resulting in the merged PST 635 in FIG. 6c2;
vii. Merge [Inst3/PST+Inst4/PST] with Ipst2/PST;
viii. Identify the common supplies: VDD and VSS;
ix. While merging we cannot remove Inst2/VDDg although this exists in only one PST, since this is the supply for which we need to find the solution.

PST 640 shows the PST after merging the PSTs of Inst2, Inst3 and Inst4. Continue with selective merging:
i. Merge [Inst2/PST+Inst3/PST+Inst4/PST] with Inst1/PST;
ii. Merge [Inst1/PST+Inst2/PST+Inst3/PST+Inst4/PST] with the Top PST;
iii. Identify common supplies: VDD and VSS;
iv. While merging, remove supplies VDDA and VDDB.

PST 650 shows the final PST for Inst1 and Inst2 powered ports. Since there is a row where Inst1 is ON and Instant2 is OFF, and there is a row where Inst1 is OFF and Instant2 is ON, isolation circuits {for example) are needed for all interconnects between ports one of which is powered from Inst1 and one of which is powered from Inst2. This illustrates how to find relationship between specific supplies of interest.

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

Figure 7:
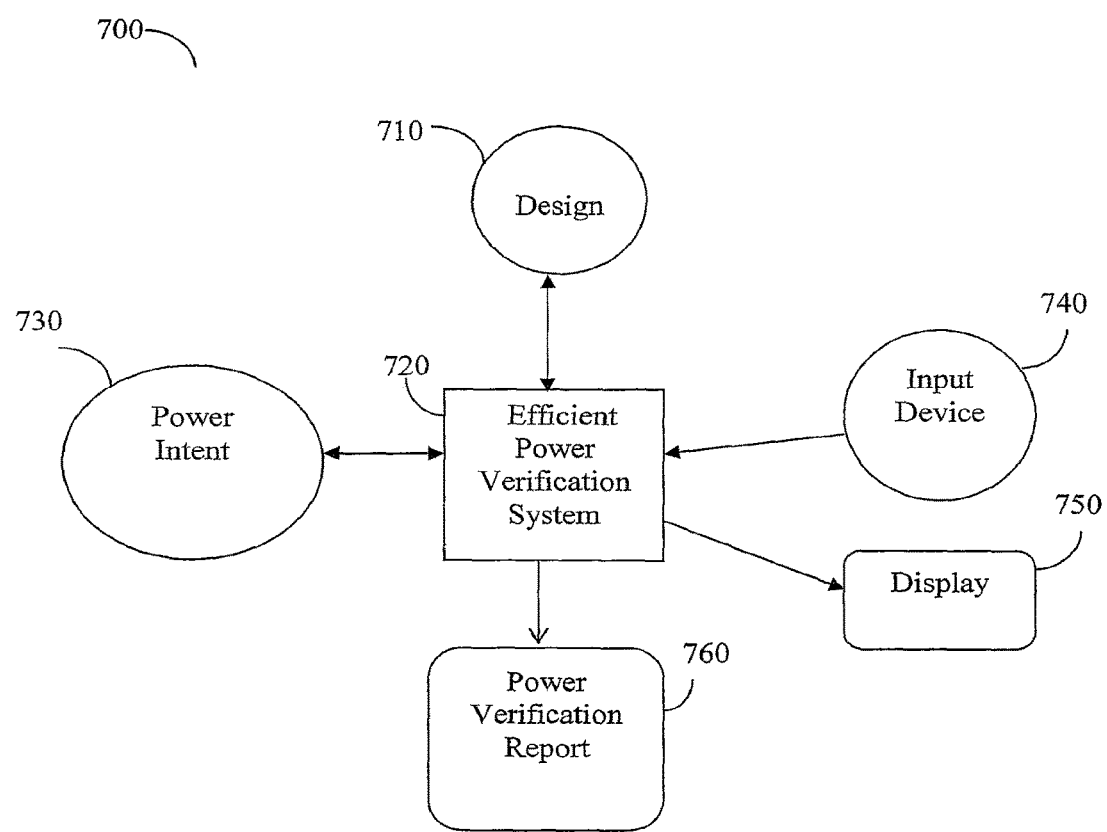
FIG. 7 shows a system for efficient power verification.

FIG. 7 is an exemplary and non-limiting diagram 700 showing the EPVS.

Design 710 contains electronic circuit module hierarchy information, module ports and interconnects. The design 710 is written in a language such as RTL (Verilog), or is provided as a netlist. The design 710 is typically stored as a file on a storage medium.

EPVS 720 reads the Soc Circuit 710 and the Power Intent 730 and produces the Power Verification report 760. During the RTL design phase EPVS 720 reads the design in RTL format and during the logic implementation phase EPVS 720 reads the design in netlist format. In one embodiment the EPVS 720 is a standalone software application running on a computer. In one embodiment the EPVS 720 is a component within an EDA tool.

Power Intent 730 describes the power supplies and power architecture for each of the modules in the SoC. The power intent 730 is described in a language such as UPF (Unified Power Format) language. The power intent 730 is typically stored as a file on a storage medium.

Device 740 and Device 750 are input and output devices for manually controlling the EPVS 720 and viewing the results the EPVS 720 produces. Input devices can be a keyboard and mouse, and output devices can be a video display and printer. The EPVS 720 supports an interactive mode where it accepts specific power-related queries and provides timely and relevant results. Designers request power information about specified supplies, ports, scopes or nets. The EPVS generates the following:
i. Error messages during the sanitization step, when an incomplete power intent is input to the EPVS;
ii. A viewer of the PSTs provided in the UPF input;
iii. A viewer of a port (voltage supply) state, showing the port name, state and voltage value in any scope;
iv. A viewer of the isolation, level-shifter and hierarchical relationships between two supplies.

Power verification report 760 lists power verification failures. The EPVS 720 displays the Power verification report 760 on the video device, and stores it as a file on a storage media.

What is claimed is:
1. A method implemented for a power verification tool in a computing system for constructing power state tables in a verification of power implementation of an electronic circuit design, the method comprising:
receiving a description of at least a portion of an electronic circuit design having two or more power domains, and storing the received description in a storage medium accessible to a processor;
receiving and storing in the storage medium a power intent file that specifies a power architecture of power/voltage domains, their power supplies and corresponding power devices of the electronic circuit design, the power intent file comprising a plurality of power state tables that define allowed combinations of power states;
preparing, by the processor, to construct merged power state tables by removing power states from the power state tables in the power intent file, comprising:
creating a scope tree representing a hierarchy of modules of the electronic circuit design with a root node being a top scope of the tree; and
at every scope, while traversing the scope tree in a child-first, parent-next post order traversal, (a) creating a list of power state tables, (b) for each pair of power state tables, removing any power states that are present in only one power state table, (c) whenever there is a power state table list at child scope, adding power state tables from that list to a consolidated power state table list used in step (b), and (d) saving the consolidated power state table list for that scope;
constructing, by the processor, merged power state tables for pairs of power supplies of interest by selectively merging those power state tables that establish a relationship between the two power supplies of interest in the pair; and
using the merged power state tables to verify whether the description of the electronic circuit design complies with the power intent file.

2. The method as in claim 1, wherein the received description is provided in a register transfer level (RTL) format.

3. The method as in claim 1, wherein the received description is provided as a netlist.

4. The method as in claim 1, wherein the electronic circuit design corresponding to the received description comprises a plurality of modules of a system-on-chip circuit, each individual module having at least one power domain and at least two modules of the system-on-chip having different power domains.

5. The method as in claim 1, wherein selectively merging power state tables comprises iteratively selecting pairs of power supplies of interest and for each power supply pair:
identifying whether the selected supply pair is related;
if unrelated, taking all possible combinations of port states of the selected supply pair used in their power state tables to build the merged power state table;
if related, identifying power state table lists for the related supply pair and merging the identified power state tables on the identified lists for the related supply pair;
merging identified power state tables two at a time, including removing any power supplies, other than the selected power supply pair, from the power state tables that are found in only one power state table, thereby maintaining a minimum size for the merged power state table; and
specifying, based on merged power supply tables, the relationship, if any, between the selected power supply pair.

6. The method as in claim 1, further comprising:
displaying on a computer display identified power verification failures and using an input device to facilitate correction and storage of at least one of the electronic circuit design and the power intent file.

7. The method as in claim 1, wherein selectively merging power state tables comprises, for pairs of power supplies of interest comprising a first power supply and a second power supply:
determining whether a first set of power supplies related to the first power supply overlaps with a second set of power supplies related to the second power supply, wherein power supplies in a power state table are defined to be directly related to each other and the set of power supplies related to a given power supply are those power supplies that are related to the given power supply either directly or indirectly;
if the first set of power supplies overlaps with the second set of power supplies, merging those power state tables that contain any of the power supplies in either the first or second sets of related power supplies to construct the merged power state table for the pair; and
if the first set of power supplies does not overlap with the second set of power supplies, using all possible combinations of port states of the first and second power supplies to construct the merged power state table.

8. The method as in claim 7, wherein determining whether the first and second sets of power supplies overlap comprises:
creating a supply list for the first power supply, the supply list listing the power supplies that are related to the first power supply either directly or indirectly; and
determining whether the supply list contains the second power supply.

9. The method as in claim 8, wherein creating the supply list for the first power supply comprises:
initially creating the supply list as containing the first power supply;
to a list of power state tables, adding any power state tables that contain any of the power supplies in the supply list and that are not already in the list of power state tables;
to the supply list, adding any power supplies that are from power state tables in the list of power state tables and that are not already in the supply list; and
repeating the steps of adding to the list of power state tables and adding to the supply list until either (a) the second power supply qualifies to be added to the supply list, or (b) no additional power supplies are added to the supply list.

10. A power verification system, comprising:
a storage medium for receiving and storing a description of at least a portion of an electronic circuit design having two or more power domains, and for receiving and storing a power intent file specifying a power architecture of power/voltage domains, their power supplies and corresponding power devices of the electronic circuit design, the power intent file comprising a plurality of power state tables that define allowed combinations of power states, and also for storing a report of power verification failures;
a processor having access to the storage medium and executing an application program for a power verification tool that constructs merged power state tables corresponding to the power domains of the electronic circuit design and that uses the merged power state tables to verify whether the electronic circuit design complies with the power intent file; and
a user interface including a computer display for displaying identified power verification failures and an input device for facilitating correction of at least one of the electronic circuit design and the power intent file;
wherein the processor executing the application program (a) prepares to construct merged power state tables by removing power states from the power state tables in the power intent file by creating a scope tree representing a hierarchy of modules of the electronic circuit design with a root node being a top scope of the tree and, at every scope, while traversing the scope tree in a child-first, parent-next post order traversal, (i) creating a list of power state tables, (ii) for each pair of power state tables, removing any power states that are present in only one power state table, (iii) whenever there is a power state table list at child scope, adding power state tables from that list to a consolidated power state table list used in step (ii), and (iv) saving the consolidated power state table list for that scope; (b) constructs merged power state tables for pairs of power supplies of interest by selectively merging those power state tables that establish a relationship between the two power supplies of interest in the pair; and (c) displays on the computer display identified power verification failures and facilitates, using the input device, correction and storage of at least one of the description of the electronic circuit design and the power intent file.

11. The system as in claim 10, wherein the received description is provided in a register transfer level (RTL) format.

12. The system as in claim 10, wherein the received description is provided as a netlist.

13. The system as in claim 10, wherein the electronic circuit design corresponding to the received description comprises a plurality of modules of a system-on-chip circuit, each individual module having at least one power domain and at least two modules of the system-on-chip having different power domains.

14. The system as in claim 10, wherein selectively merging power state tables by the processor comprises iteratively selecting pairs of power supplies of interest and for each power supply pair:
  identifying whether the selected supply pair is related;
  if unrelated, taking all possible combinations of port states of the selected supply pair used in their power state tables to build the merged power state table;
  if related, identifying power state table lists for the related supply pair and merging the identified power state tables on the identified lists for the related supply pair;
  merging identified power state tables two at a time, including removing any power supplies, other than the selected power supply pair, from the power state tables that are found in only one power state table, thereby maintaining a minimum size for the merged power state table; and
  specifying, based on merged power supply tables, the relationship, if any, between the selected power supply pair.

15. A non-transitory computer readable storage medium containing an application program for a power verification tool that constructs power state tables for verification of power implementation of an electronic circuit design, the application program executable on a processor to perform a method comprising:
  accessing a power intent file that specifies a power architecture of power/voltage domains and their power supplies for an electronic circuit design, the power intent file comprising a plurality of power state tables that define allowed combinations of power states;
  preparing to construct merged power state tables by removing power states from the power state tables in the power intent file, comprising:
    creating a scope tree representing a hierarchy of modules of the electronic circuit design with a root node being a top scope of the tree; and
    at every scope, while traversing the scope tree in a child-first, parent-next post order traversal, (a) creating a list of power state tables, (b) for each pair of power state tables, removing any power states that are present in only one power state table, (c) whenever there is a power state table list at child scope, adding power state tables from that list to a consolidated power state table list used in step (b), and (d) saving the consolidated power state table list for that scope;
  constructing merged power state tables for pairs of power supplies of interest by selectively merging those power state tables that establish a relationship between the two power supplies of interest in the pair; and
  using the merged power state tables to verify whether the electronic circuit design complies with the power intent file.

16. The non-transitory computer readable storage medium as in claim 15, wherein selectively merging power state tables comprises, for pairs of power supplies of interest comprising a first power supply and a second power supply:
  determining whether a first set of power supplies related to the first power supply overlaps with a second set of power supplies related to the second power supply, wherein power supplies in a power state table are defined to be directly related to each other and the set of power supplies related to a given power supply are those power supplies that are related to the given power supply either directly or indirectly;
  if the first set of power supplies overlaps with the second set of power supplies, merging those power state tables that contain any of the power supplies in either the first or second sets of related power supplies to construct the merged power state table for the pair; and
  if the first set of power supplies does not overlap with the second set of power supplies, using all possible combinations of port states of the first and second power supplies to construct the merged power state table.

17. The non-transitory computer readable storage medium as in claim 16, wherein determining whether the first and second sets of power supplies overlap comprises:
  initially creating a supply list as containing the first power supply;
    to a list of power state tables, adding any power state tables that contain any of the power supplies in the supply list and that are not already in the list of power state tables;
    to the supply list, adding any power supplies that are from power state tables in the list of power state tables and that are not already in the supply list; and
    repeating the steps of adding to the list of power state tables and adding to the supply list until either (a) the second power supply qualifies to be added to the supply list, or (b) no additional power supplies are added to the supply list.

18. The non-transitory computer readable storage medium as in claim 15, wherein determining whether the first and second sets of power supplies overlap comprises:
  creating a supply list for the first power supply, the supply list listing the power supplies that are related to the first power supply either directly or indirectly; and
  determining whether the supply list contains the second power supply.

19. The non-transitory computer readable storage medium as in claim 15, wherein selectively merging power state tables comprises iteratively selecting pairs of power supplies of interest and for each power supply pair:
  identifying whether the selected supply pair is related;
  if unrelated, taking all possible combinations of port states of the selected supply pair used in their power state tables to build the merged power state table;
  if related, identifying power state table lists for the related supply pair and merging the identified power state tables on the identified lists for the related supply pair;
  merging identified power state tables two at a time, including removing any power supplies, other than the selected power supply pair, from the power state tables that are found in only one power state table, thereby maintaining a minimum size for the merged power state table; and
  specifying, based on merged power supply tables, the relationship, if any, between the selected power supply pair.

20. The non-transitory computer readable storage medium as in claim 15, wherein the electronic circuit design corresponding to the received description comprises a plurality of modules of a system-on-chip circuit, each individual module having at least one power domain and at least two modules of the system-on-chip having different power domains.

* * * * *